US005365136A

United States Patent [19]

Deboves

[11] Patent Number: 5,365,136

[45] Date of Patent: Nov. 15, 1994

[54] BRUSH FOR AN ELECTRIC MOTOR HAVING LOW SENSITIVITY TO VIBRATIONS

[75] Inventor: Jean-Bernard Deboves, Amiens, France

[73] Assignee: Le Carbone Lorraine, Amiens Cedex, France

[21] Appl. No.: 55,375

[22] Filed: May 3, 1993

[30] Foreign Application Priority Data

May 4, 1992 [FR] France ............................ 92 05886

[51] Int. Cl.$^5$ ............................ H02K 13/00

[52] U.S. Cl. ............................ 310/252; 310/249; 310/253

[58] Field of Search ............................ 310/248, 249, 51, 251, 310/252, 253; 29/826, 597; 252/502

[56] References Cited

U.S. PATENT DOCUMENTS

| | | | |
|---|---|---|---|
| 938,604 | 11/1909 | Miller | 310/249 |
| 2,375,818 | 5/1945 | Peters | 29/826 |
| 2,631,252 | 3/1953 | Falcettoni | 310/249 |
| 2,866,112 | 12/1958 | Matz | 310/249 |
| 3,076,908 | 2/1963 | Pfaender | 310/249 |
| 3,666,688 | 5/1972 | McCafferty | 310/249 UX |
| 4,075,524 | 2/1978 | Bradshaw | 310/249 |
| 4,579,611 | 4/1986 | Broady | 310/249 |

FOREIGN PATENT DOCUMENTS

| | | | |
|---|---|---|---|
| 2322713 | 11/1974 | Germany . | |
| 0556465 | 10/1943 | United Kingdom | 310/248 |
| 985597 | 3/1965 | United Kingdom . | |
| 0291537 | 1/1971 | U.S.S.R. | 310/248 |

OTHER PUBLICATIONS

Handbook of Chemistry and Physics, Section B-79, Jun. 1972.

Derwent Publications Ltd., London, GB; & JP-A-62 283 582 (Hitachi Chemical KK) Dec. 9, 1987.

*Primary Examiner*—R. Skudy

*Attorney, Agent, or Firm*—Dennison, Meserole, Pollack & Scheiner

[57] ABSTRACT

Brush for electric motors obtained by compression of an electrically conductive powder containing one end of an electrical conductor so as simultaneously to allow the formation of the brush and the mechanical fixing of said electrical conductor, and characterized in that the density of at least a portion of the compressed powder in contact with the end of the immersed electrical conductor is higher than the mean density of the compressed powder so as to improve the strength of said mechanical fixing when said brush is subjected to vibrations.

10 Claims, 6 Drawing Sheets

FIG. 9d
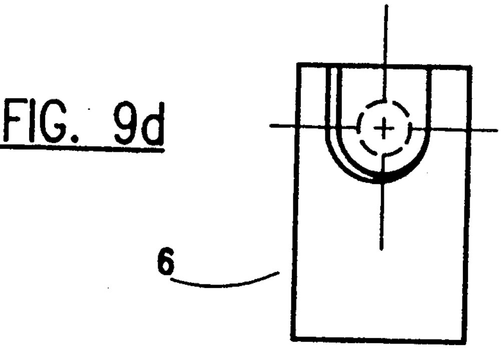
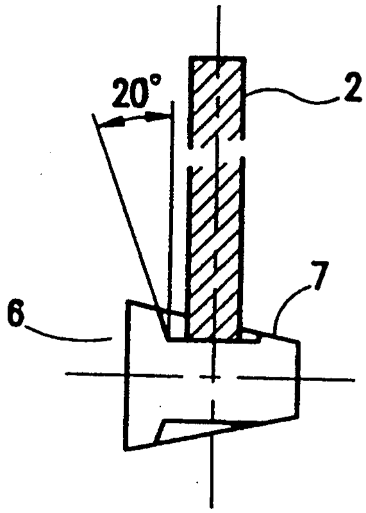
FIG. 9b
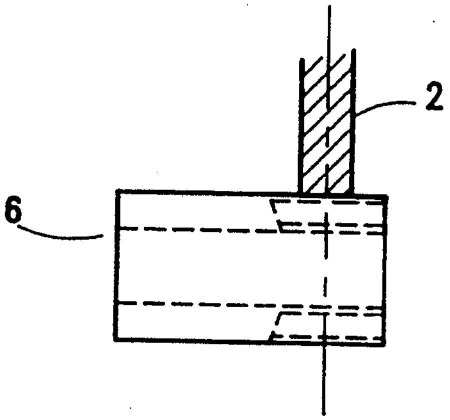
FIG. 9a
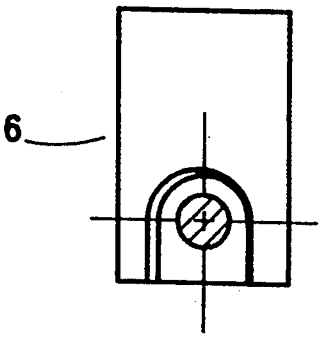
FIG. 9c

BRUSH FOR AN ELECTRIC MOTOR HAVING LOW SENSITIVITY TO VIBRATIONS

FIELD OF THE INVENTION

The invention relates to the sphere of brushes of electric motors, these brushes generally comprising a wearing part of electrically conductive material intended to provide the electrical contact with the commutator blades and an electrical conductor in the form of a wire, cable or braid fixed to the wearing part.

BACKGROUND OF THE INVENTION

In numerous situations, electric motors are subjected to vibrations which may result from the operation of the motor itself or which may come from the environment of the motor, for example when this motor is placed next to a vehicle or a machine which is itself subjected to numerous vibrations.

When normal operation of the motor is accompanied by vibrations of high frequency and intensity, it has been found that the braid could become detached from the wearing part, causing a stoppage of the motor which could have the most serious consequences.

This has been found, in particular, with the most economical brushes of simple design obtained by mere compression of electrically conductive powder, in which the braid is fixed to the wearing part merely by immersing the braid in the powder during compression of the conductive powder.

On the other hand, brushes of a more elaborate design which typically involve several stages of manufacture and are therefore more expensive than the previous ones, for example brushes of which the braid is brazed to the wearing part, are better at withstanding intense vibrations.

Attempts have already been made to solve the problem posed, that is to obtain brushes which are both economical and resistant to intense vibrations.

Thus, German patent 2 322 713 proposes various solutions for solving this problem.

According to one solution proposed, an elastic housing is provided at the point of the connection, the housing being composed of an elastic part.

According to another solution, an additional mass is adjoined to the braid in the vicinity of the connection.

A further solution involves injecting plastics material into the braid.

Finally, this patent proposes, for the connection, a housing which widens as the surface of the brush is approached.

The inventors have found that although some of these solutions improved the resistance of the connection to vibrations, in particular those involving the addition of a plastic part, the addition of a plastic part can give rise to a problem of heat resistance in a considerable number of cases, not to mention the extra manufacturing cost.

SUMMARY OF THE INVENTION

As a solution to the problem posed, the inventors have sought to develop a brush which is economical and has better resistance to vibrations than the economical brushes from the prior art.

The term economical brushes refers to brushes of which the "braid—wearing part" connection is produced by the compression of the powder to form the wearing part without any additional operation intended to reinforce or modify this connection.

The invention also relates to a process for obtaining such a brush.

According to the invention, the brush for electric motors comprises a wearing part of electrically conductive material, an electrical conductor in the form of a wire, cable or braid of which one end penetrates and is immersed in said wearing part, the brush being obtained by compression of an electrically conductive powder containing one end of said electrical conductor so as simultaneously to allow the formation of said wearing part and the mechanical fixing and electrical connection of said electrical conductor and said wearing part, and is characterized in that the density of at least a portion of said electrically conductive material in contact with said end immersed in said wearing part is higher than the mean density of said electrically conductive material so as to form a super-compressed region round said immersed end and to improve the strength of said mechanical fixing when said brush is subjected to vibrations.

Investigations carried out by the inventors have in fact demonstrated the important role of the "density" factor without this role being clearly understood. In fact, as the sphere of vibratory phenomena is highly complex, the relationship between a local increase in the density of the material sheathing the end of the braid and an improvement in the strength of the connection between the braid and the wearing part in a brush subjected to considerable vibrations could not be anticipated.

Figure 1A:
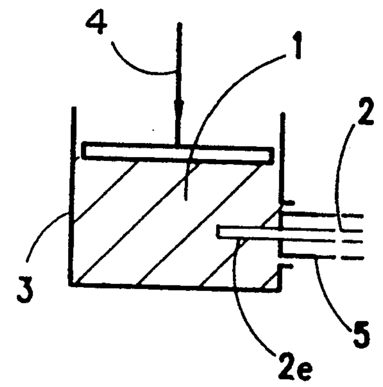
FIG. 1*a* shows schematically, in a longitudinal section, a mold 3 filled with electrically conductive powder 1 immersing the end 2*e* of an electrical conductor 2 and equipped with two compression means: a first compression means 4 for substantially densifying all the conductive powder and a second compression means 5 allowing local densification, round the end 2*e* of the conductor 2, of the conductive powder previously densified by means of the first compression means 4.
Figure 1B:
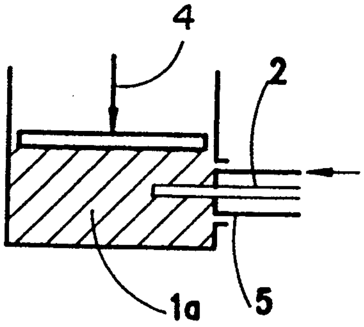
FIG. 1*b* is similar to FIG. 1*a* except that the first compression means 4 has been actuated, leading to the formation of a non-super compressed material 1*a* of substantially homogeneous density, this density d1 being substantially lower than the mean density df of the final brush.
Figure 1C:
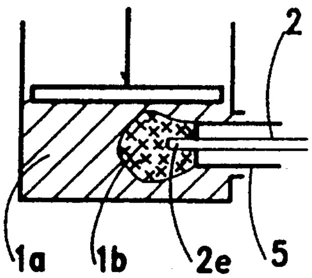
FIG. 1*c* is similar to FIG. 1*b* except that the second compression means 5 has been actuated so as to form a sheath of material 1*b* surrounding the end 2*e* of the electrical conductor 2, the material 1*b* having a density d2 which is higher than d1.
Figure 1D:
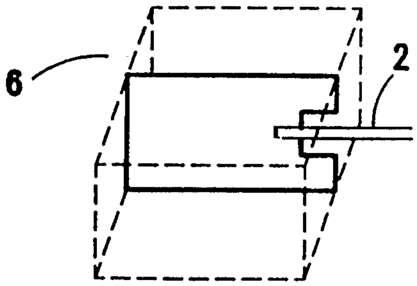
FIGS. 1*d* and 1*e* are intended to demonstrate the variety of the shapes of brushes 6, FIG. 1*d* showing a brush of rectangular section and FIG. 1*e* a brush of trapezoidal section (except in the fixing region of the end 2*e* of the electrical conductor 2).
Figure 1E:
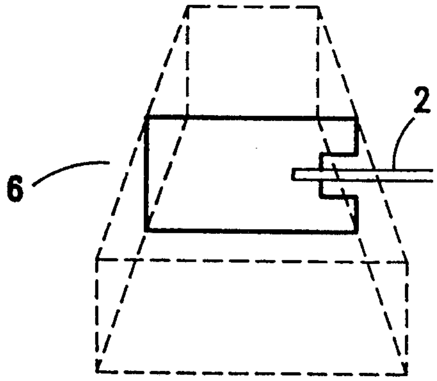
Figure 2:
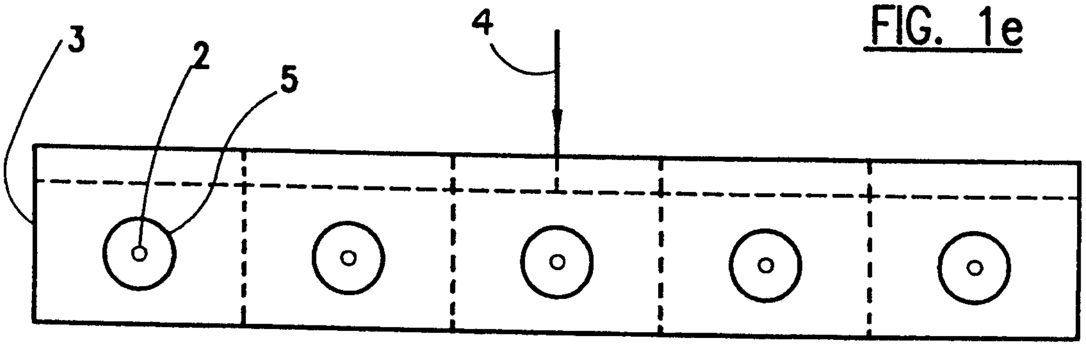
FIG. 2 shows schematically, in a front longitudinal section, a mold 3 equipped with a single first compression means 4 and five second compression means 5 so as to obtain a block which, after sawing, will lead to the formation of five brushes.
Figure 3:
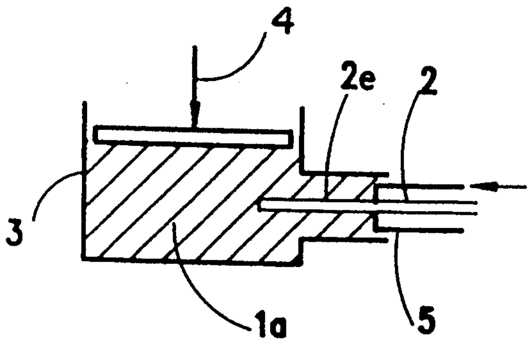
FIGS. 3, 4 and 5 are similar to FIG. 1*b*.
Figure 4:
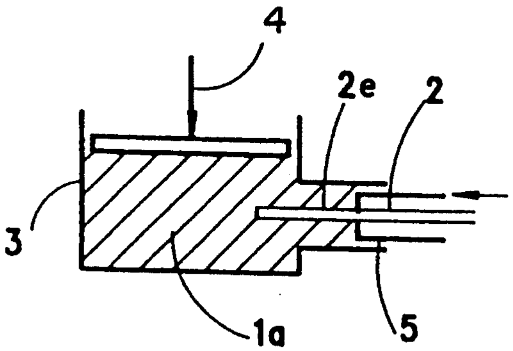
Figure 5:
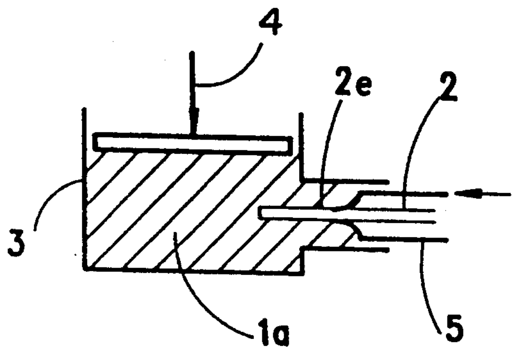

in the brush 6 in FIG. **3*a* obtained with the means in FIG. 3 the sheath of dense material 1*b* externally exceeds the plane 7 of reference constituting the face of the brush 6 traversed by the end 2*e***;

in the brush 6 in FIG. **4*a* obtained with the means in FIG. 4, the sheath of dense material 1*b* is in the region of the plane 7 of reference constituting the face of the brush 6 traversed by the end 2*e***;

in the brush 6 in FIG. **5*a* obtained with the means in FIG. 5, the sheath of dense material 1*b* is limited externally by a substantially funnel-shaped surface which is tangentially connected to the end 2*e***.

Figure 6:
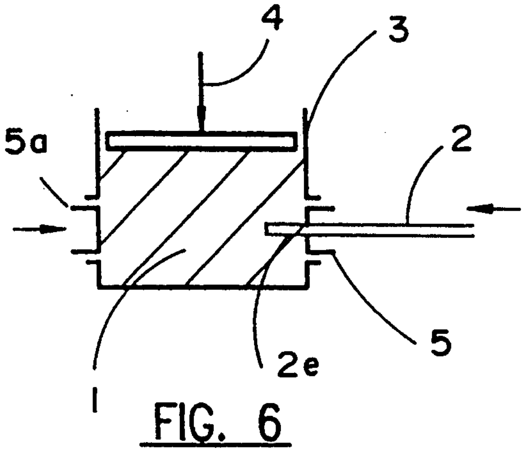
Figure 6A:
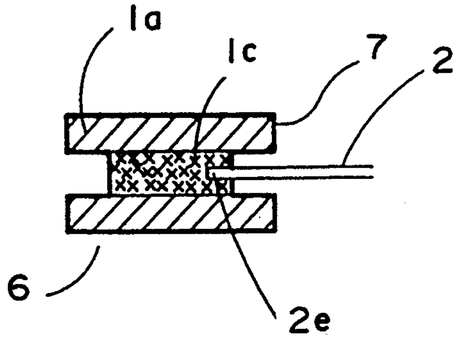

FIG. 6 shows a means of obtaining the brush 6 in FIG. **6*a* which is symmetrical to a sheath 1*c* of very high density material owing to the use of two second compression means 5 and 5*a*** facing one another along a same axis.

Figure 7:
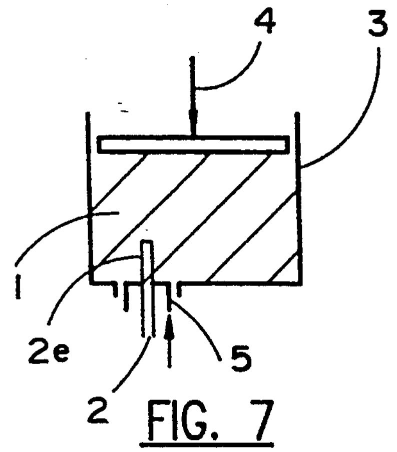
Figure 7A:
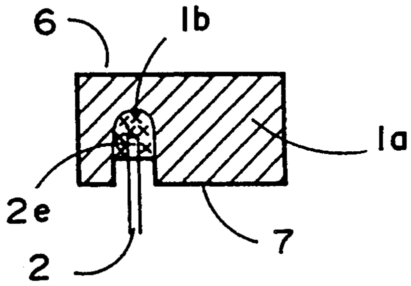

FIG. 7 shows a means for obtaining the brush 6 in FIG. **7*a*. According to this embodiment of the invention, the first compression means 4 and the second compression means 5** are parallel but in opposite directions.

Figure 8:
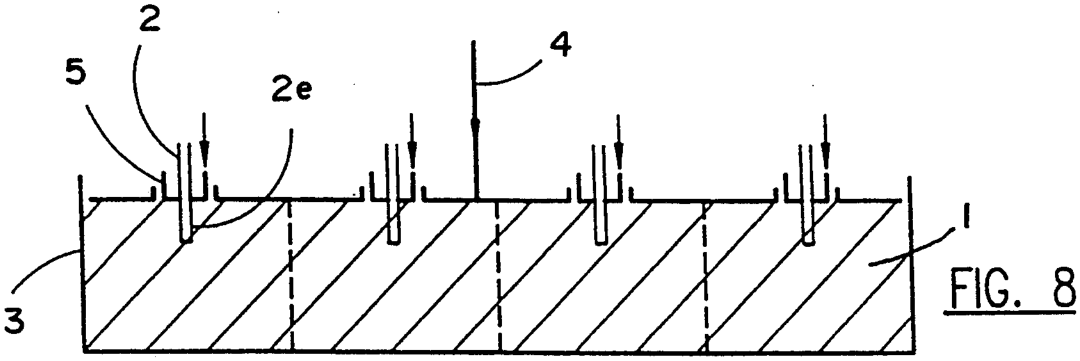
Figure 8A:
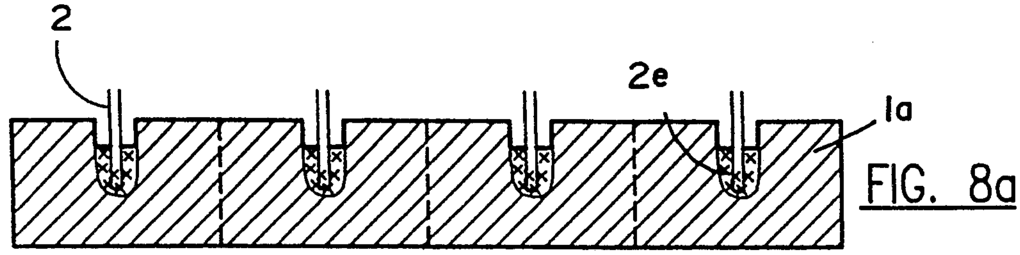
Figure 10D:
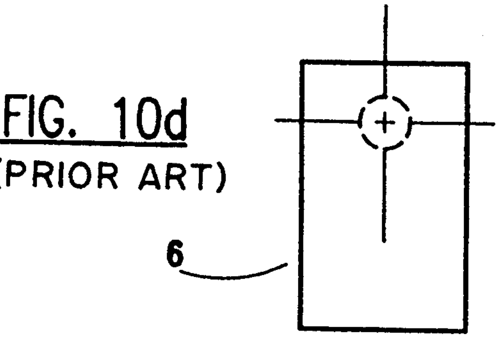
FIG. 10d (PRIOR ART)
Figure 10B:
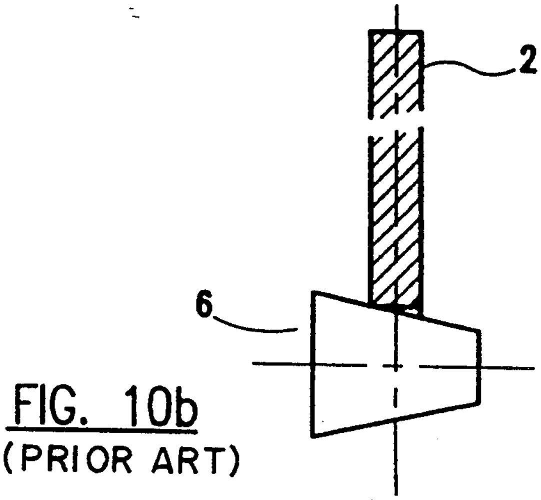
FIG. 10b (PRIOR ART)
Figure 10C:
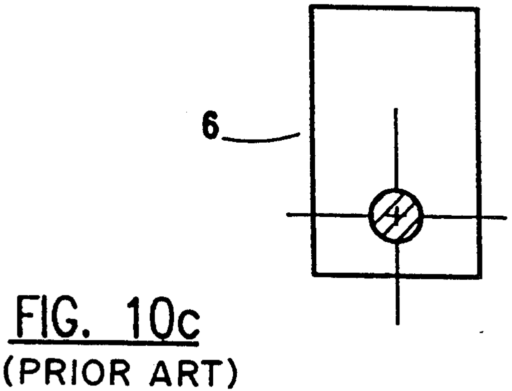
FIG. 10c (PRIOR ART)
Figure 10A:
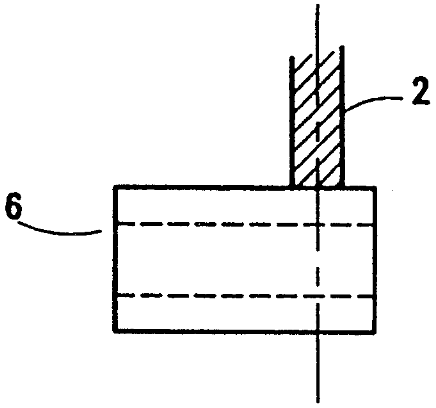
FIG. 10a (PRIOR ART)

FIG. 8 shows a further means for obtaining a block of four brushes shown in FIG. **8*a*. In this Figure, the first compression means 4 and the second compression means 5** are parallel and in the same direction.

FIGS. **9*a* to 9*d*** show the various views of a brush of trapezoidal section according to the invention obtained according to the example in the description (scale: 2).

FIGS. **10*a* to 10*d* show various views of a brush from the prior art having the same external dimensions as the brush in FIG. 9** (comparison example).

Figure 11A:
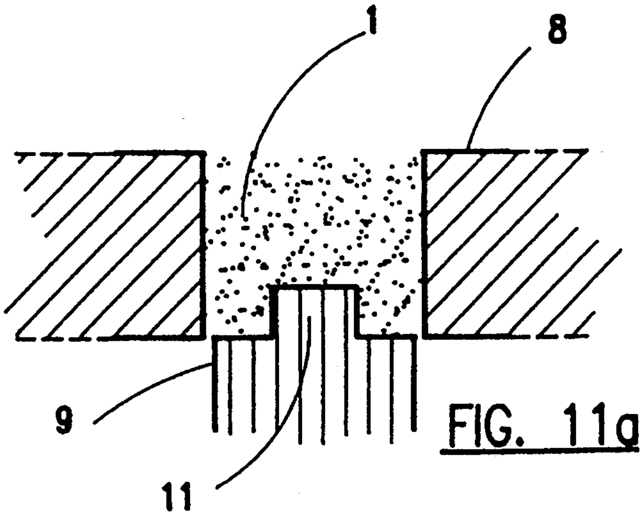
Figure 11B:
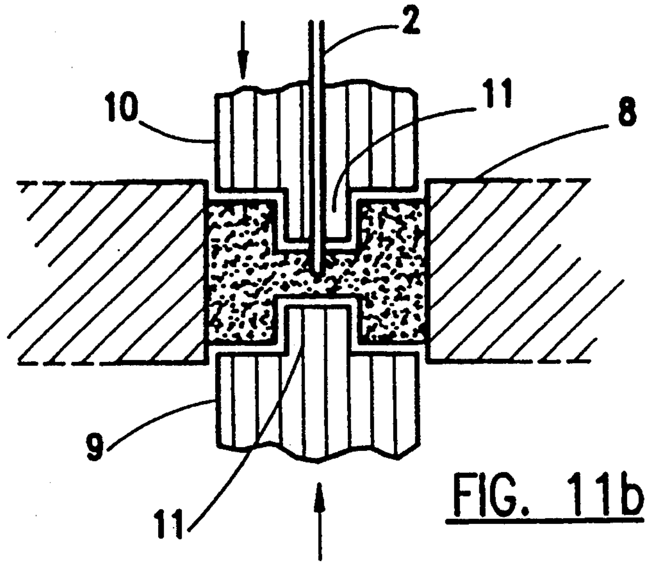
Figure 11C:
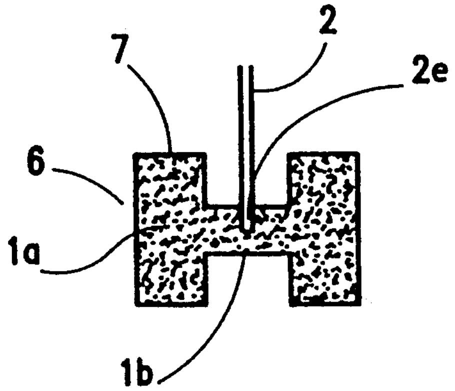

FIGS. **11*a* and 11*b* show schematically the process for production according to the invention of the brush according to FIG. 11*c*, the brush being similar to the one in FIGS. 9*a* to 9*d*. In this process, a stationary die 8 equipped with two moving punches, a lower punch 9 and an upper punch 10 carrying the electrical conductor 2 and each provided with a relief portion 11 facing one another so as to obtain a super-compressed region 1*b* sheathing the end 2*e* of the electrical conductor 2** when the punches are brought together.

DETAILED DESCRIPTION OF THE INVENTION

The inventors have found that it was preferable for the density of all said electrically conductive material in contact with said end immersed in said wearing part to be higher than the mean density of said electrically conductive material.

It has surprisingly been found that a very positive effect on the mechanical fixing of the electrical conductor and the wearing part when the brush is subjected to vibrations was demonstrated even with relatively low local super-compression: said higher density of the super-compressed region merely has to be at least 5% higher than said mean density.

Said electrically conductive material having a density higher than the mean density generally surrounds said end and therefore forms a sheath of super-compressed material. This sheath which opens to the exterior therefore has its own external surface. The external surface may be, at least in part, either in the plane of the face (face designated by 7 in the drawings) of said wearing part traversed by said electrical conductor or offset from said plane. Thus, brushes according to FIGS. **1*d*, 6*a*, 7*a*, 9*b*** have a sheath of super-compressed material of which the external surface stands back internally relative to the face of the wearing part traversed by the electrical conductor.

A brush according to FIG. **4*a*** according to the invention has a sheath of super-compressed material of which the external surface is in the plane of the face of the wearing part traversed by the electrical conductor.

Figure 3A:
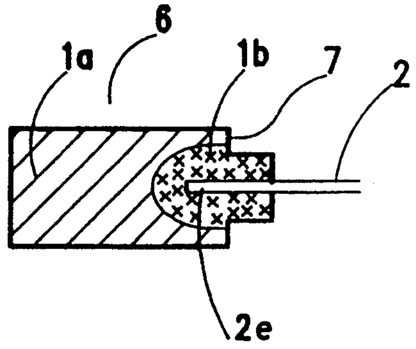
FIGS. 3*a*, 4*a* and 5*a* show, in section, the brushes 6 obtained with the corresponding means shown in FIGS. 3, 4 and 5 respectively. These Figures illustrate three cases which are distinguished by the shape of the sheath of material **1*b* and the relative position of this sheath with regard to the plane 7 constituting the face of the brush 6 traversed by the end 2*e***.
Figure 4A:
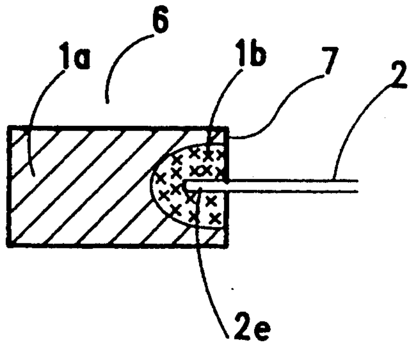

On the other hand, a brush according to FIG. **3*a* of the invention has a sheath of super-compressed material of which the external surface externally exceeds the face of the wearing part traversed by the electrical conductor. However, these last two embodiments (FIGS. 3*a* and 4*a***) constitute merely possible, not preferred, embodiments of the invention: said external surface preferably stands back relative to said plane so as to form a cavity from the bottom of which said conductor emerges.

Figure 5A:
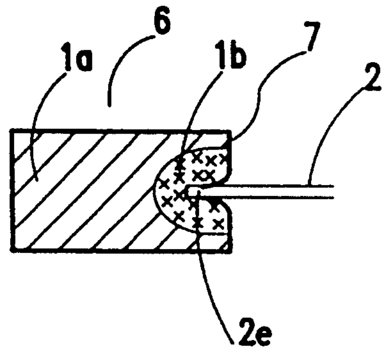

The external surface of the super-compressed sheath is also characterized by its own geometric shape. It forms a plane traversed by said electrical conductor in the case of the brushes in FIGS. **1*d*, 3*a*, 4*a*, 7*a*, 9*b*. It may form a surface which is typically funnel-shaped and gradually moves away from said conductor as the exterior of the brush is approached. In this case, as shown schematically in FIG. 5*a***, said external surface and the surface of said conductor are preferably joined tangentially, the external surface forming a cavity relative to the face of the wearing part.

The inventor have found that a suitable method of forming a super-compressed sheath involved forming a brush with two cavities which are symmetrical about a plane of the brush, the electrical conductor emerging from the bottom of one of the two cavities as shown in FIG. **6*a* or FIG. 9*b***.

According to the invention, said conductive powder serving to form the wearing part by compression is selected from a graphite powder, a metallic powder or a mixture of graphite and metallic powder. It is preferable to use a mixture of graphite powder and from 50 to 80% by weight of metallic powder in which the density of the material constituting the super-compressed region is at least 7% higher than the mean or average density of the material of the wearing part.

There are numerous methods of producing the brush according to the invention.

According to a first embodiment of the invention, said powder 1 is introduced into a mold 3 equipped with at least two compression means 4, 5, and said end **2*e* of the electrical conductor 2 connected to one of the compression means is introduced into said powder 1 then everything is compressed by means of a first compression means 4 to obtain an electrically conductive material 1*a* having a density which is substantially lower than the mean density, and at least a portion of this electrically conductive material in contact with said electrical conductor is finally compressed by means of a second compression means 5 so as to obtain at least partial sheathing of said electrical conductor with a material 1*b*** having a density equal to said higher density.

According to several variations, this process is illustrated by FIGS. **1*a*–1*c*, 3, 4, 5, 6, 7, 8**.

According to a second embodiment of the invention shown schematically in FIGS. **11*a*–*b*–*c* there is used a stationary die 8 equipped with two moving punches, a lower punch 9 and an upper punch 10** carrying the electrical conductor 2, each being provided with a relief portion 11 facing one another so as to obtain a super-compressed region or sheathing material 1*b* for entirely sheathing the end 2*e* of the electrical conductor 2 when the punches are brought together. A brush comprising two symmetrical hollows or recesses, the electrical conductor emerging from the bottom of one of these two recesses is thus obtained.

EXAMPLE

The brush according to the invention shown in various views on a scale of 2 in FIGS. 9*a* to 9*d* was produced.

A mixture containing 69% of metal powder containing a mixture of copper and lead was formed, the remainder being a graphite powder. It was placed in a chamber formed by the die 8 and the lower punch 9 equipped with a relief portion 11 and was compressed by means of the upper punch 10 also equipped with a relief portion 11 through which the end of the conductor 2 passes, according to the process shown schematically in FIGS. 11*a* and 11*b*.

A brush according to the invention having a super-compressed region forming a sheath for the end 2*e* of the electrical conductor 2 was thus obtained. Externally, this brush has two symmetrical recesses, the electrical conductor issuing from the base of one of them.

The non-super-compressed portion or material formed 1*a* had a density of 4 whereas the super-compressed region 1*b* had a density ranging from 4.32 to 4.4, that is a density 8 to 10% higher than that of the non-super-compressed material 1*a*. In view of the respective volumes of the super-compressed and non-supercompressed portion, the super-compressed portion representing only a small fraction of the whole (typically 5 to 20% by volume), the mean density of the wearing part is 4.06.

COMPARISON EXAMPLE

In the comparison example according to the prior art, everything is identical to the example according to the invention except that there is no super-compression, the compression dies not having a relief portion. The brush obtained is the one shown in FIGS. 10*a* to 10*d* (scale 2). This brush has the same external dimensions as the one produced according to the invention and it has a homogeneous density of 4.

COMPARISON RESULTS

The two brushes were tested on a vibrating bench and a pronounced improvement in the mechanical fixing of the end of the electrical conductor and the wearing part was observed. The service life of the brush subjected to vibrations is greatly increased with the brush according to the invention and is at least doubled at the frequencies normally encountered in motors.

USE

The brushes according to the invention are used as starter motor brushes and more particularly as starter motor brushes having a flat commutator, the flat commutator starter motors vibrating relatively markedly in the sense which excites the vibration of the electrical conductor. Therefore, the invention allows the use of economical brushes in cases where relatively expensive brushes were required according to the prior art.

I claim:

1. Brush for electric motors comprising:
   - a wearing part of electrically conductive material having a variable density,
   - an electrical conductor selected from a group consisting of a wire, cable or braid, said electrical conductor having at least one end for penetrating and immersing in said wearing part so that said one end is mechanically fixed and electrically connected to said wearing part,
   - a brush being obtained by compression of an electrically conductive powder containing said one end of said electrical conductor so as simultaneously to allow as formation of said wearing part, a mechanical fixing and an electrical connection of said electrical conductor and said wearing part,
   - characterized in that a density of at least a portion of an electrically conductive material of said wearing part in contact with said at least one end of said electrical conductor is higher than an average density of said electrically conductive material so as to form a super-compressed region around said immersed end.

2. Brush according to claim 1 in which said density is at least 5% higher than said average density.

3. Brush according to claim 1 in which said electrically conductive material having said density higher than the average density surrounding said end forms a sheath of material of which an inherent external surface is in a plane of a face (7) of said wearing part traversed by said electrical conductor and is offset from said plane.

4. Brush according to claim 3 in which said external surface is preferably offset relative to said plane so as to form a cavity from whose bottom said conductor emerges.

5. Brush according to claim 3 in which said external surface of said sheath of material forms a plane traversed by said conductor.

6. Brush according to claim 3 in which said external surface forms a surface, typically funnel-shaped, which gradually moves away from said conductor as a exterior of the brush is approached.

7. Brush according to claim 6 in which said external surface and a surface of said electrical conductor are joined tangentially.

8. Brush according to claim 4 of which said wearing part has symmetry about a plane and comprises two cavities which are symmetrical about said plane, said electrical conductor emerging from a bottom of one of the two cavities.

9. Brush according to claim 1 in which said conductive powder is selected from a graphite powder, a metal powder a mixture of graphite and metal powder.

10. Brush according to claim 9 in which said conductive powder is a mixture of graphite powder and of 50 to 80% by weight of metal powder and in which the density of the material constituting the super-compressed region is at least 7% higher than the average density of the material of the wearing part.

* * * * *